United States Patent

[11] 3,556,371

| [72] | Inventors | Walter Douglass<br>Hertfordshire;<br>Colin Gwyn Lewis, Middlesex, England |
|---|---|---|
| [21] | Appl. No. | 744,967 |
| [22] | Filed | July 15, 1968 |
| [45] | Patented | Jan. 19, 1971 |
| [73] | Assignee | Eastman Kodak Company<br>Rochester, N.Y.<br>a corporation of New Jersey |
| [32] | Priority | July 19, 1967 |
| [33] | | Great Britain |
| [31] | | 33249/67 |

[54] FILM ADVANCING MECHANISM
5 Claims, 5 Drawing Figs.

[52] U.S. Cl. ................................................ 226/63,
226/68, 226/158
[51] Int. Cl. .................................................. G03b 1/22
[50] Field of Search ....................................... 226/63, 67,
68, 70—72, 87, 147, 151, 62, 158, 161; 352/191

[56] References Cited
UNITED STATES PATENTS

| 2,168,987 | 8/1939 | Hopkins ..................... | 352/191 |
| 2,444,706 | 7/1948 | Loew ......................... | 226/68X |

Primary Examiner—Richard A. Schacher
Attorneys—Robert W. Hampton and G. Herman Childress ABSTRACT: A mechanism for intermittently advancing toward a printing station a strip of film having perforated sections separated by nonperforated or irregularly perforated sections includes two spaced and independently operable film advancing members which are selectively engageable with and disengageable from the sprocket holes so that, as the members are moved in a film advancing direction, at least one of the members is engageable with a sprocket hole even though the other member may be positioned over the unperforated or irregularly perforated section of the film.

PATENTED JAN 19 1971
3,556,371
WALTER DOUGLASS
COLIN G. LEWIS
INVENTORS
BY G. Herman Childress
Robert W. Hampton
ATTORNEYS
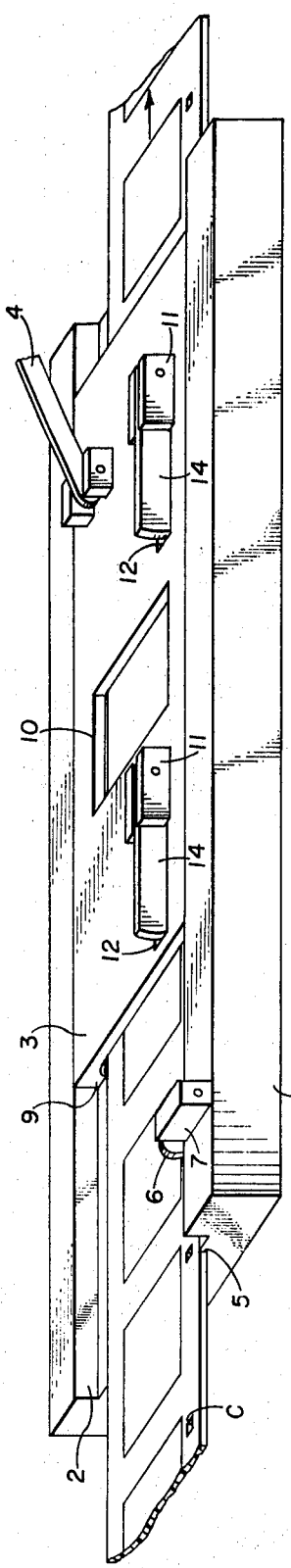
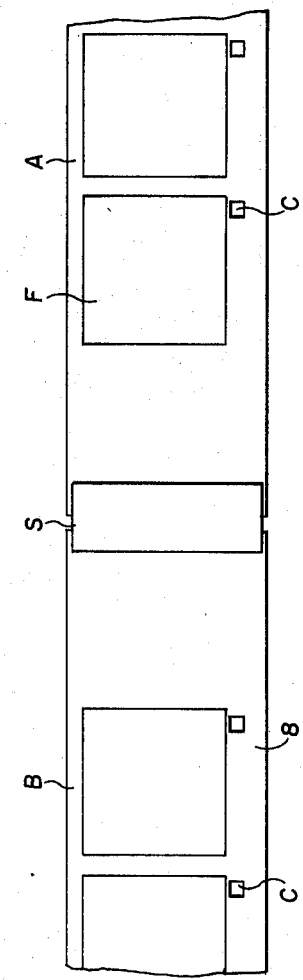
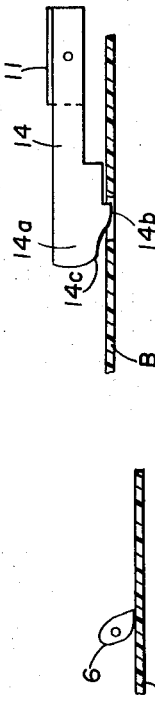
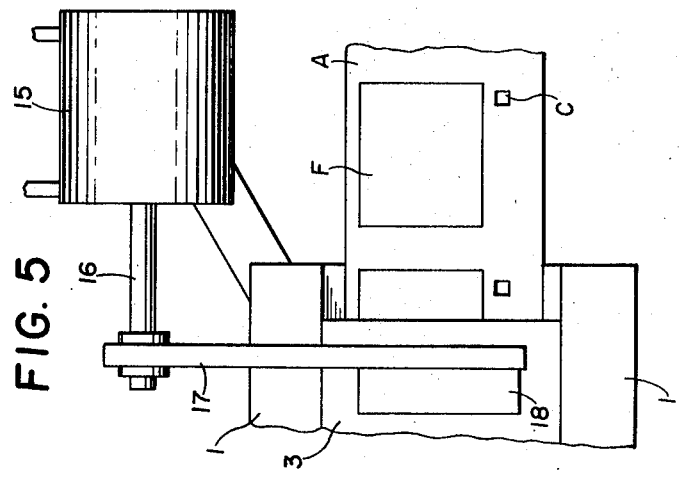

FILM ADVANCING MECHANISM

BACKGROUND OF THE INVENTION

1. Field of the Invention

This invention relates to a claw-type advancing mechanism for regularly perforated film or other elongate material.

2. Description of the Prior Art

Advancing mechanisms of this type are used, for example, for longitudinally moving a photographic film through a film projector or printing machine and successively positioning picture frames on the film in register with a film gate. If the film being advanced is joined and includes an unperforated splice section, or if the perforated sections are joined so that the perforations do not extend continuously and regularly throughout the length of the film, then a single claw advancing mechanism may be effective to position the film frames correctly in the film gate. Thus in a photographic printing machine it may be necessary at certain positions of such a joined film to effect manual control of the picture frame registration.

SUMMARY OF THE INVENTION

It is an object of the present invention to provide an improved advancing mechanism for film or other elongated strip material which is effective to advance lengths of perforated film or the like joined together by a length of unperforated or irregularly perforated material. Another object of the invention is to provide a film advancing mechanism operable to correctly position a length of film being advanced even though the film has one or more damaged or irregularly placed perforations. A further object of the invention is to provide a mechanism of the class described which limits the application of force being applied to the film to a level or quantity which is less than the force ordinarily required to break the film.

The present invention comprises a carriage moveable along a slideway and supporting a plurality of film advancing members. The members are spaced from each other and are independently operable for movement into and out of engagement with perforations or holes in a strip of film. The advancing members are spaced apart so that when one of the advancing members is positioned over an unperforated portion of the filmstrip, the other of the members is engageable with a sprocket hole for advancing the strip of film.

BRIEF DESCRIPTION OF THE DRAWINGS

FIG. 1 is an isometric view of the main parts of a film advancing mechanism of this invention;

FIG. 2 is a view illustrating a typical filmstrip which is only partially visible in FIG. 1;

FIG. 3 is a view showing the engagement of one of the film advancing claws with the film;

FIG. 4 is a view showing the nonreturn pawl engaging the film; and

FIG. 5 shows a reciprocating mechanism for the slide carriage.

Referring to FIG. 2 of the drawings, an advancing mechanism is adapted to advance longitudinally a joined film formed of a first film A and a second film B, the two films being of 126 type for example and being regularly and continuously perforated alongside the picture area in identical manner with sprocket holes C. Each film has a unperforated length adjacent to a splice S which joins the two films together. A picture frame F is formed adjacent each sprocket hole.

Referring now to FIG. 1, the film advancing mechanism is arranged to advance the film intermittently to position the picture frames in turn in printing position. The mechanism comprises a body 1 having machined slideways 2 which allow a slide carriage 3 slidably mounted therein to be reciprocated longitudinally by reciprocating means 4. A shallow slot 5 is also formed in the body to accommodate a film being advanced therethrough and a nonreturn pawl 6 which is wider than the film sprocket holes is pivotally mounted on a supporting lug 7 and adapted to engage one side of the film outside the picture area, as at 8 in FIG. 2, to prevent reverse movement of the film during return movement of the slide carriage 3.

The slide carriage 3 is flat and is provided with side flanges 9 for engaging the slideways 2, and with a picture aperture 10 extending through the slide carriage to one side of its midpoint. A pair of trunnion blocks 11 are mounted on the slide carriage at the ends of the picture aperture and alongside one of two slots 12 extending through the slide carriage aligned with the line of movement along the body of the sprocket holes C of the film. A claw member 14, shown in FIGS. 1 and 3, is pivotally mounted in each pair of trunnion blocks 11 with a claw head 14a disposed in the slot 12. A sprocket hole engaging claw 14b extends from the lower side of the claw head, and both the forward ends of the claw head and the sprocket hole engaging claw are provided with cam surfaces 14c to facilitate sliding movement of the claw members out of a sprocket hole and over the surface of a film during return movement of the slide carriage 3. The sprocket hole engaging claws 14b are spaced an integral multiple, for example five times, of the sprocket hole pitch of the film. This spacing must be such that where a joined film passes through the mechanism with the last sprocket hole of one filmstrip spaced more than the regular sprocket hole pitch from the leading sprocket hole of the following filmstrip then at least one of the engaging claws 14b should engage a sprocket hole for each advancing movement as the joined part of the film passes through the mechanism.

In operation of the mechanism, a regularly perforated film is positioned between the body 1 and slide carriage 3 as shown in FIG. 1, and the slide carriage is first slid by the reciprocating mechanism 4 from the fully advanced position, as shown, towards the left side of this figure until it reaches the fully returned position. This stroke exceeds the sprocket hole pitch of the film, but is less than twice this distance, so that the sprocket hole engaging claws 14b, which are biased by gravity (or by spring means) against the upper surface of the film, will each slide past one sprocket hole C during this return movement. In the following film advancing movement of the slide carriage 3, which takes place towards the right of FIG. 1, both engaging claws 14b will drop into these sprocket holes shortly after the start of this movement, and the film will then be advanced until the fully advanced position of the slide carriage is again reached. The film will then have been advanced by the sprocket hole pitch and the related picture frame will have been positioned in the picture aperture 10 in the printing position. In the following return movement of the slide carriage 3 the engaging claws 14b ride out of the sprocket holes as a result of the shaping of the cam surfaces 14c, and the film advancing cycle my be repeated.

Where the film is formed by the joining of two similarly perforated lengths of film A and B each having unperforated lengths adjacent to a splice S, the leading engaging claw, during one of the return movements of the slide carriage 3, will slide on an unperforated filmstrip and will remain in retracted position until the other engaging claw has advanced the film sufficiently for the leading engaging claw to engage a film perforation beyond the splice. The other engaging claw will remain retracted as the film is advanced by the leading engaging claw. When both engaging claws are again operating on the same series of sprocket holes, they will both advance the film during film advancing movements of the slide carriage.

If the sprocket holes of the two similarly perforated lengths of joined film are not spaced by an integral multiple of the sprocket hole spacing, then the leading engaging claw can still engage in the first sprocket hole following the splice so long as the claw passes over this sprocket hole during the return movement of the slide carriage. The claw will then be biased into the sprocket hole as it reaches this hole during the advance stroke and will advance the film until the fully advanced positions of the slide carriage is reached. This particular film movement will be less than the sprocket hole pitch, but the film advance movement will return to normal during the following stroke.

Thus the invention provides a film advancing mechanism that is effective with a single regularly perforated photographic film having picture frames related to the perforations, and also with lengths of similar film joined together, with or without intervening unperforated portions, despite reasonable departures from regular sprocket hole positioning in the joined film. The use of a double claw also facilitates correct positioning of a film having a damaged perforation. Clearly the mechanism will also advance other perforated elongate material.

Various modifications of the mechanism are possible without losing the advantages of the invention. For example, the nonreturn pawl may be mounted on a lug at the film outlet end of the body 1 in preference to the film inlet end as shown. Further, the reciprocating means, which in many instances will incorporate an eccentric driven from a rotating shaft, may include spring means or magnetic means to interrupt the reciprocating action if the film tension becomes excessive. Thus the reciprocating means could be attached to the slide carriage only by way of a permanent magnet magnetically coupled to the slide carriage, the attractive force being less than the force required to break the film. In one modification, shown diagrammatically in FIG. 5, the reciprocating means comprises a compressed air operated piston and cylinder device, the cylinder 15 being fixed to and aligned parallel to the body 1, and the piston being connected to the slide carriage 3 through a pull bar 16 carrying a cross bar 17 of magnetic material of square cross section which is normally maintained in attractive engagement with a permanent magnet 18 mounted on the slide carriage.

The invention has been described in detail with reference to preferred embodiments thereof, but it will be understood that variations and modifications can be effected within the spirit and scope of the invention as described hereinabove and as defined by the appended claims.

We claim:

1. Means for intermittently advancing toward a printing station a strip of film having first and second perforated sections, each of which contain a plurality of substantially equally spaced sprocket holes, said strip further including an unperforated section between said perforated sections, said advancing means comprising:

means defining a slideway along which the strip is adapted to be advanced in a predetermined direction;

A carriage movable along said slideway through a cycle of operation comprising an advance stroke and a return stroke;

a plurality of strip advancing members supported by said carriage and movable therewith, each of said advancing members having portions engageable with said sprocket holes during the advance stroke of said carriage and disengageable from the sprocket holes during the return stroke of the carriage thereby to cause movement of the strip along the slideway during the advance stroke of said carriage, said advancing members being independently engageable with and disengageable from said sprocket holes of either perforated strip section, and said advancing members being spaced from each other so that when one of said advancing members is positioned over the unperforated strip section during the advance stroke of the carriage another of said members is positioned over one of the perforated strip sections so that the latter member is engageable with a sprocket hole for advancing the strip during the advance stroke of the carriage; and means for moving said carriage through its cycle of operation, said carriage moving means including a first magnetic member carried by said carriage and a second magnetic member engageable with said first magnetic member, said magnetic members normally being held in engagement by magnetic attraction therebetween, and power means coupled to said second magnetic member for reciprocating said second magnetic member, thereby to reciprocate said carriage along said slideway.

2. Advancing means as set forth in claim 1 further comprising means positionable along said slideway and engageable with a strip thereon for holding said strip against movement during the return stroke of said carriage.

3. Advancing means as set forth in claim 1 wherein each of said advancing members comprises an elongate claw member pivotally moveable about one end portion thereof with respect to the carriage, said claw members each having a claw head at the other end portion thereof adapted to enter the sprocket holes of the strip, and said claw heads each having a cam surface engageable with a portion of the strip bounding a sprocket hole for camming said claw head out of the sprocket hole during the return stroke of said carriage.

4. Advancing means as set forth in claim 1 wherein said advancing members are spaced apart by an integral multiple of the spacing between the sprocket holes in the strip and by a distance at least equal to the spacing between the sprocket holes on each side of and nearest to the unperforated section 5. In apparatus for advancing a strip of web material, the apparatus having a carriage movable through a cycle of operation comprising a web advance stroke and a return stroke, and means supported by the carriage for engaging the web during the advance stroke of the carriage to effect movement of the web with the carriage during such advance stroke, the improvement comprising:

a first magnetic member carried by said carriage;

a second magnetic member engageable with said first magnetic member; and power means coupled to said second magnetic member for reciprocating said second magnetic member, thereby reciprocating the first magnetic member and said carriage.